(12) United States Patent
Giotta

(10) Patent No.: US 7,177,917 B2
(45) Date of Patent: Feb. 13, 2007

(54) SCALEABLE MESSAGE SYSTEM

(75) Inventor: Paul Giotta, Winterthur (CH)

(73) Assignee: Softwired AG, Zurich (CH)

( * ) Notice: Subject to any disclaimer, the term of this patent is extended or adjusted under 35 U.S.C. 154(b) by 756 days.

(21) Appl. No.: 09/750,009

(22) Filed: Dec. 27, 2000

(65) Prior Publication Data
US 2002/0120717 A1 Aug. 29, 2002

(51) Int. Cl.
G06F 15/16 (2006.01)
(52) U.S. Cl. .................. 709/219; 709/204; 709/227
(58) Field of Classification Search ............... 709/203, 709/204, 205, 206, 207, 218
See application file for complete search history.

(56) References Cited

U.S. PATENT DOCUMENTS

| | | | | |
|---|---|---|---|---|
| 5,303,343 | A * | 4/1994 | Ohya et al. | 709/246 |
| 5,345,558 | A * | 9/1994 | Opher et al. | 709/236 |
| 5,390,170 | A * | 2/1995 | Sawant et al. | 370/399 |
| 5,519,707 | A * | 5/1996 | Subramanian et al. | 370/399 |
| 5,561,807 | A * | 10/1996 | Verplanken et al. | 719/314 |
| 5,581,753 | A * | 12/1996 | Terry et al. | 707/201 |
| 5,649,103 | A * | 7/1997 | Datta et al. | 709/203 |
| 5,694,547 | A * | 12/1997 | Subramanian et al. | 709/224 |
| 5,974,449 | A | 10/1999 | Chang et al. | |
| 5,983,265 | A * | 11/1999 | Martino, II | 709/206 |
| 5,991,892 | A * | 11/1999 | Honda | 714/4 |
| 6,038,592 | A * | 3/2000 | Verplanken et al. | 709/215 |
| 6,078,948 | A * | 6/2000 | Podgorny et al. | 709/204 |
| 6,097,723 | A * | 8/2000 | Fielding et al. | 370/395.2 |
| 6,157,946 | A * | 12/2000 | Itakura et al. | 709/217 |
| 6,182,111 | B1 * | 1/2001 | Inohara et al. | 709/201 |
| 6,195,345 | B1 | 2/2001 | Kramer | |
| 6,205,479 | B1 * | 3/2001 | Dulai et al. | 709/225 |
| 6,253,230 | B1 * | 6/2001 | Couland et al. | 709/203 |
| 6,279,029 | B1 * | 8/2001 | Sampat et al. | 709/203 |
| 6,466,978 | B1 * | 10/2002 | Mukherjee et al. | 709/225 |
| 6,477,569 | B1 * | 11/2002 | Sayan et al. | 709/223 |

(Continued)

FOREIGN PATENT DOCUMENTS

WO WO 01/56234 A1 8/2001

(Continued)

OTHER PUBLICATIONS

Henk L. Muller etc, "The Data Diffusion Machine with a Scalable Point-to-Point Network", Oct. 1993, Technical Report CSTR-9 17, Department of Computer Science, University of Bristol.*

(Continued)

Primary Examiner—Jason Cardone
Assistant Examiner—Thomas Duong
(74) Attorney, Agent, or Firm—Oppedahl Patent Law Firm LLC

(57) ABSTRACT

A message system for delivering data in the form messages between message clients comprises a server cluster with a group of client manager nodes and a group of independent message manager nodes. The client manager nodes have the function of managing client connections, whereas the message manager are configured to store and distribute messages. The system further comprising communication channel means in the form of a multicast messagebus for providing a multicast communication channel between said at least one client manager node and said at least one message manager node. The system guarantees delivery of a message by storing it until a receiver is ready to consume it.

20 Claims, 2 Drawing Sheets

Message System Diagram

U.S. PATENT DOCUMENTS

| | | | |
|---|---|---|---|
| 6,549,516 B1 * | 4/2003 | Albert et al. | 370/236 |
| 6,557,111 B1 * | 4/2003 | Theimer et al. | 714/4 |
| 6,594,693 B1 * | 7/2003 | Borwankar | 709/219 |
| 6,606,315 B1 * | 8/2003 | Albert et al. | 370/352 |
| 6,606,316 B1 * | 8/2003 | Albert et al. | 370/389 |
| 6,628,654 B1 * | 9/2003 | Albert et al. | 370/389 |
| 6,629,138 B1 * | 9/2003 | Lambert et al. | 709/224 |
| 6,633,560 B1 * | 10/2003 | Albert et al. | 370/351 |
| 6,650,641 B1 * | 11/2003 | Albert et al. | 370/392 |
| 6,678,735 B1 * | 1/2004 | Orton et al. | 709/230 |
| 6,687,222 B1 * | 2/2004 | Albert et al. | 370/230 |
| 6,704,278 B1 * | 3/2004 | Albert et al. | 370/216 |
| 6,735,169 B1 * | 5/2004 | Albert et al. | 370/229 |
| 6,742,045 B1 * | 5/2004 | Jordan et al. | 709/238 |
| 6,775,692 B1 * | 8/2004 | Albert et al. | 709/207 |
| 6,802,067 B1 * | 10/2004 | Camp et al. | 719/315 |
| 6,804,818 B1 * | 10/2004 | Codella et al. | 719/315 |
| 6,836,462 B1 * | 12/2004 | Albert et al. | 370/235 |
| 6,859,527 B1 * | 2/2005 | Banks et al. | 379/106.03 |
| 6,912,565 B1 * | 6/2005 | Powers et al. | 709/205 |
| 6,970,913 B1 * | 11/2005 | Albert et al. | 709/217 |

FOREIGN PATENT DOCUMENTS

| | | |
|---|---|---|
| WO | WO 03/005194 | 1/2003 |

OTHER PUBLICATIONS

Anawat Chankhunthod etc, "A Hierarchical Internet Object Cache", 1996, 1996 USENIX Technical Conference, pp. 153-163.*

Michael J. Feeley etc, "Implementing Global Memory Management in an Workstation Cluster", 1995, ACM 15th Symposium on Operating Systems Principles, pp. 201-212.*

Prasenjit Sarkar etc, "Efficient Cooperative Caching Using Hints", 1996, Second USENIX Symposium on Operating Systems Design and Implementation, pp. 35-46.*

Anderl et al., An Enhanced Message Networking Topology: Multimedia Messaging with the Intuity TM Interchange Server, Bell Labs Technical Journal, Apr. 1, 1998, pp. 124-135, vol. 3, No. 2.

* cited by examiner

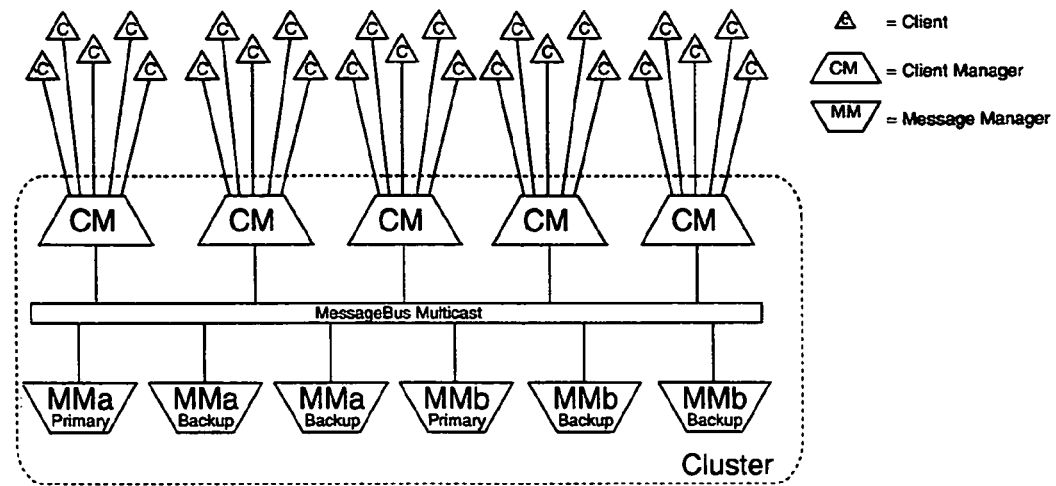
Drawing 1: Message System Diagram
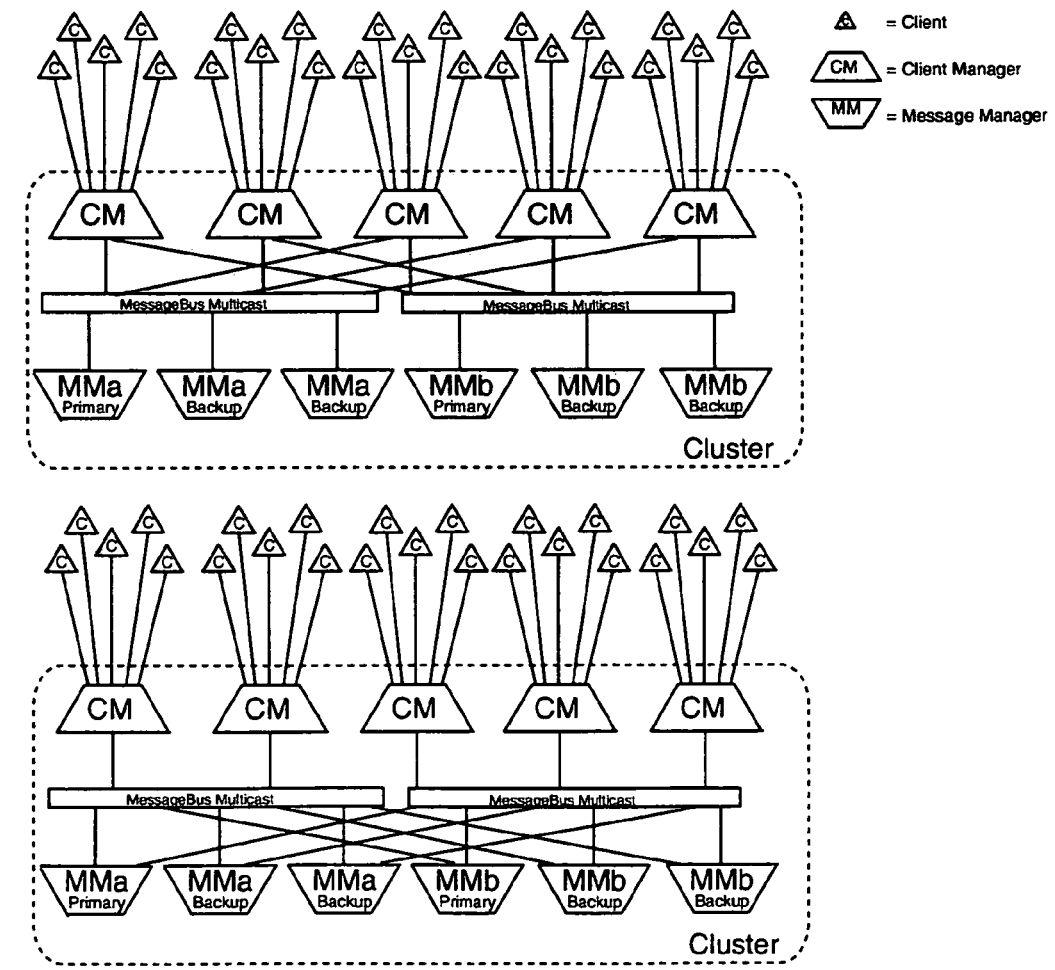
Drawing 2: Alternate Network Topologies

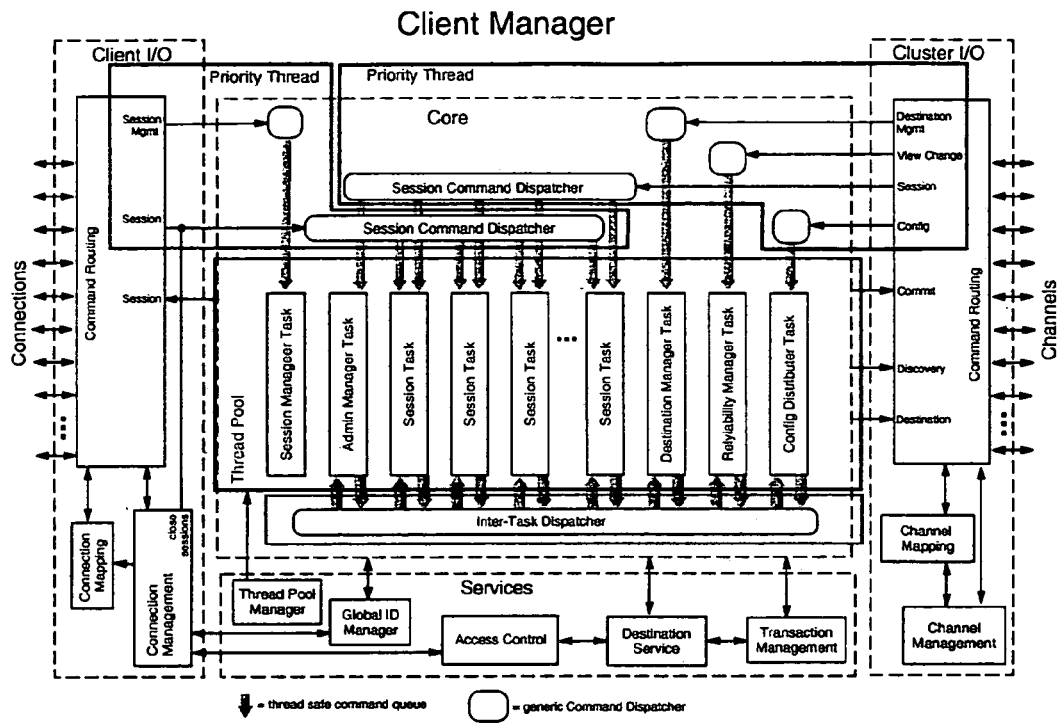
Drawing 3: Client Manager Architecture
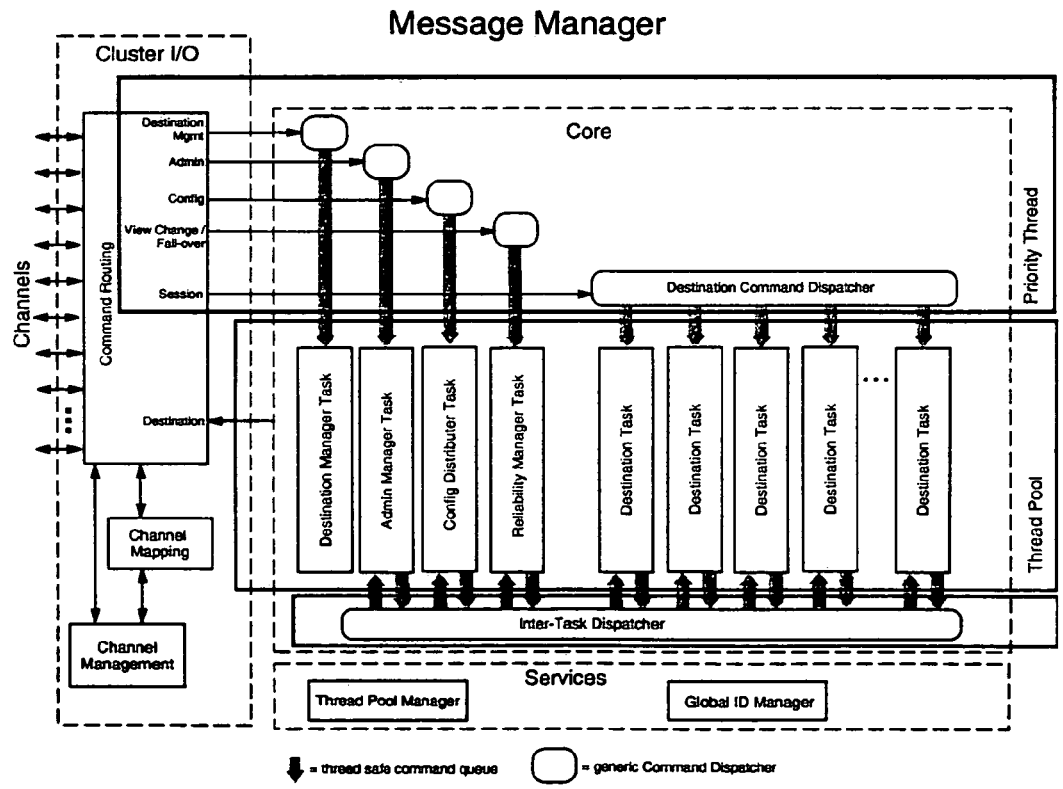
Drawing 4: Message Manager Architecture

SCALEABLE MESSAGE SYSTEM

FIELD OF THE INVENTION

The invention is in the field of methods and systems of delivering messages between computer programs via a message server.

BACKGROUND OF THE INVENTION

This invention more specifically pertains to the field of Message Oriented Middleware (MOM). MOM enables multiple computer programs to exchange discrete messages with each other over a communications network. MOM is characterized by 'loose coupling' of senders and recipients, in that the sender of a message need not know details about the identity, location or number of recipients of a message. Furthermore, when an intermediary message server is employed, message delivery can be assured even when the ultimate receivers of the message are unavailable at the time at which it is sent. This can be contrasted with Connection Oriented Middleware, which requires a computer program to have details of the identity and network location of another computer, in order that it can establish a connection to that computer before exchanging data with it. To establish a connection, both computers must be available and responsive during the entire time that the connection is active. Despite the similarities with email, MOM is not e-mail. E-mail is a system for moving text messages and attachments to human consumers. MOM is for moving messages containing arbitrary data between computer programs. An implementation of an E-mail system could be realized using MOM, however.

This invention pertains specifically to the case where an intermediary message server in employed to store and distribute messages. Although the senders and receivers (collectively referred to as clients) are loosely coupled with each other when communicating via MOM, the intermediary message servers are normally required to communicate with these clients in a connection-oriented fashion. Thus permitting senders and receivers to communicate without both being available at the same time requires the server to be available at all times. Furthermore all clients who may wish to exchange messages must be connected to the same server, or different servers which are capable or working together in a connection-oriented fashion to achieve the equivalent functionality of a single server, i.e. to serve as a single logical server. MOM is often used in systems in which a large number of servers have to serve as one logical server, as one of the reasons for employing MOM is to alleviate the requirement of defining which programs may exchange data with each other a priori. This means that large organizations that use MOM for computer applications distributed throughout the organization, or organizations that use MOM to provide service to the general public over the internet, must be ready to accommodate many thousands of programs communicating through a single logical server. In addition, there may be demands to be able to deliver messages within a limited amount of time. Security trading, live online auctions and chat rooms are examples of potential MOM applications that have restriction on the amount of time required to deliver messages. These factors combine to create the need for MOM servers that can handle large message volumes quickly and reliably.

The following factors dictate the need for a single logical message server that is implemented using the combined resources of multiple physical computers in order to meet the needs of the most demanding MOM applications:

There are inherent limits on the amount of message throughput that can be achieved with a message server running on a single computer.

The possibility of hardware failure results in the need for redundant computer hardware containing identical copies of all critical data at all times.

A group of inexpensive computers may be able to provide a required level of functionality more cost effectively that a single large computer.

In the context of this document, we will define a cluster as a group of computers that work together to provide a single service with more speed and higher reliability than can be achieved using a single computer.

A critical measure of the effectiveness of a cluster is scalability. Scalability can generally defined as the degree to which increased functionality is achieved by employing additional resources. The uniqueness of this invention is the way in which it addresses the scalability issues of message server clustering. The specific aspects of scalability that it addresses are:

Scalability with respect to performance: This is the degree to which adding additional computers to the cluster can increase the amount of data that can be delivered with in a time period, or the speed at which an individual message can delivers to its destinations.

Scalability with respect to connections: Each active connection to the cluster consumes a certain amount of system resources, placing a limit on the number of connections that can be active at one time, even if these connections are not used to transfer significant amounts of data. This describes the degree to which adding additional computers to the cluster increases the number of simultaneous active connections that are possible.

Scalability with respect to redundancy: This is the degree to which adding additional computers to the cluster can increase the redundancy, and therefore the reliability of the cluster, especially with regard to data storage. If each piece of data is copied onto two different computers, then any one computer can fail without causing data loss. If each piece of data is copied onto three different computers, then any two computers can fail without causing data loss. Etc.

Scalability with respect to message storage: This is the ability to increase the total storage capacity of the cluster by adding more machines. A clustering scheme that requires all computers in the cluster to store all messages cannot scale its storage capacity beyond the storage capacity of the least capable computer in the cluster.

Scalability with respect to message size: This concerns the maximum limit on the size of a single message. Unlike the other aspects of Scalability, this is not related to the number of computers in the cluster. Conventional message server solutions cause the maximum message size to be determined by the amount or working memory (RAM) available in the computers that handle the message, when other aspects of the implementation do not limit it to be even less than that. This invention alleviates this restriction and allows maximum message size to be limited only by the amount of mass storage (hard disk capacity) available on each computer.

Messaging cluster implementations according to the state of the art are mere extensions of servers architected to run on a single computer. Each computer in the cluster is a complete server, with extensions that allow it to work together with other servers in the cluster. In order to insure that all messages are available to all potential receivers, all servers in the cluster must share information about the existence of messages and/or the existence of receivers with all other servers in the cluster. The current state of the art in reliable network communications is unicast (point-to-point) network connections. The use of unicast to exchange data between all possible pairs of computers in the cluster results in inefficient usage of the communications network that severely limits Scalability. In a cluster of N servers, each piece of information that a server must share with all other servers in the cluster must be sent N−1 times across the same communication network. This means that adding additional servers to the cluster causes more communications network capacity to be used, even when the actual data rate does not change. This does not scale well, since adding large numbers of servers to a cluster will cause the communication network to become saturated, even with small numbers of senders and receivers, and low message volumes.

SUMMARY OF THE INVENTION

It is thus an objective of the invention to deliver a system and a method for delivering data using MOM which overcomes drawbacks of existing systems and methods and which specifically provides a highly scalable message server.

This objective is achieved by the invention as defined in the claims.

According to the invention different functions are assigned to different computers in the cluster. The programs running on each individual computer cannot, and need not, operate as a complete server. This actually eliminates the need for all computers in the cluster to communicate with all other computers in the cluster. Additionally, a reliable multicast (point to multipoint) protocol is employed to further reduce the need for identical data be sent multiple times across the same communications network.

The invention thus defined uses a unique cluster design to achieve a higher degree of scalability than has been previously possible with this type of server. The cluster is designed to scale well with respect to number of connections, message volume, and reliability. This means that the capacity of the cluster in each of these areas will increase as more machines are added to the cluster. In addition it is designed to be scaleable with respect to message size, in that it will not fail to operate with messages of arbitrarily large size.

The cluster consists of two distinct types of nodes. These can be visualized as forming 2 layers, with each layer consisting exclusively on one type of node. The top layer is reachable by messaging clients and consists of Connection Manager (CM) nodes. CM's are responsible for managing all activities that are specific to client connections. The lower layer consists of nodes of type Message Manager (MM). MM's have no direct contact with clients and are responsible for managing all activities that are specific to message storage and distribution.

In order to connect to the cluster, a client must connect to one of the CM's. All of CM's in a cluster are interchangeable. A client will get the exact same service from the cluster, regardless of which CM is connects to. The CM is responsible for managing client connections, client authentication, access control, forwarding messages from producer clients to the MM and forwarding messages from the MM to a consuming client. As stated above, all of the CM's are interchangeable, and additional CM's can be added to increase the total number of clients that can be served by the cluster. If a CM fails, the clients that were previously connected to that CM may reconnect to another CM and continue functioning without any loss of service.

Messages are stored in a destination until they are consumed. The destination can be a queue or a topic, depending on the actual service desired. These terms are defined in the JMS specification. Each destination exists on one or more MM's. When a destination exists on more than one MM, one of them is designated as the primary and is responsible for providing all of the services of the destination. All others MM's containing that destination are backups, which maintain the same state as the primary, but do not provide any services unless the primary fails to function. Increasing the number of MM's increases the capacity of the cluster to store messages and increases the number of destinations that can be accomodated. Increasing the number of MM's also permits an increase in the number of backup MM's, which decreases the likelihood of loosing data if multiple nodes fail simultaneously.

In order to assure that all clients can send messages to, and receive from, all destinations, it is necessary that all CM's can communicate with all MM's, and vice versa. It is not necessary for CM's to directly communicate with other CM's. It is not necessary for MM's to communicate with each other directly, except for communication between primaries and their corresponding backups. This reduces the number of connections that must be maintained between node by half, compared to traditional cluster designs that require all nodes to be connected to each other. As discussed below, the use of multicast communication removes the need for point to point connections between nodes entirely. Despite this, the fact that not all pairs of nodes require direct communications still provides benefit because it allows a lot of freedom in creating partitioned network topologies that prevent network communication from becoming the bottleneck that limits the performance of the cluster. (See Drawing 2: Alternate Network Topologies)

The transfer of data between CM's and MM's is achieved using a reliable multicast protocol. Multicast protocols are different than unicast (point to point communication) protocols in that they enable one piece of data to be distributed to multiple machines across a network without have to send that same data over the same network multiple times. It is different than broadcast protocols in that it does not require the data to be distributed to all computers on the local network. Multicast is the most efficient means of distributing identical data to a limited number of computers on the same local area network. The preferred embodiment of this invention uses the reliable multicast communication protocol provided by the product iBus//MessageBus from Softwired.

Since data is distributed via multicast, the primary and backup MM's can receive the same data without incurring significantly more network traffic than there would be if no backups were present. This means that the cluster can have as many backups as desired, resulting in no limit on the Scalability of storage redundancy. The cluster does not, however, require that all machines store all messages, which would limit the Scalability of cluster storage capacity.

The unique aspect of this invention is its ability to provide the function of single logical message server, while providing a high degree of scalability in all of the following respects:

Scalability with respect to performance: Load balancing permits performance to scale as the number of nodes is increased. Different clients the connect to different CM's and exchange messages over different destinations must not access the same nodes at the same time, thus all operations done by the cluster on behalf of these clients may execute in parallel. Limits are imposed when many clients compete for resources of the same CM or the same MM (too much load on one destination), as well as by the data network that interconnects the cluster. When the cluster is deployed with: client applications that distribute load evenly over many destinations; client connection logic that distributes clients evenly over CM's and network topologies that permit maximal parallel data transfer between CM's and MM's, then there is no fixed limit in performance.

Scalability with respect to connections: The number of connections that may be maintained scales linearly with the number of CM's. This means that if each CM can handle n connections, then m CM's can handle m×n connections. The number of CM nodes may be increased independently of the number of MM nodes.

Scalability with respect to redundancy: The use of multicast data communication allows backup nodes maintain data synchronization with their primary node without adding load to the primary or consuming additional network bandwidth This means that a cluster may be deployed with as many redundant backups as desired, without a significant impact on cluster performance.

Scalability with respect to message storage: On a single node, message storage is limited by the amount of mass storage (hard disk space) that can be attached to that node, as well as the speed at which data can be transferred to and from that mass storage. This cluster design does not require all MM nodes to store all data. Each primary MM stores different data, and the total amount of storage capacity scales linearly with the number of primary MM nodes, assuming all MM nodes have the same storage capacity and the client application is effective in distributing load evenly across destinations.

Scalability with respect to message size: Message size is unrelated to the number of nodes in the cluster, but avoiding a fixed limit on the maximum size is also an important scalability issue. This cluster design allows clients to send messages that are located only in mass storage. The message is read from mass storage in chunks, with each chunk being sent to a CM and forwarded to an MM where it is placed back into mass storage. The first chunks of the message may be written to mass storage in the MM before the last ones are read from mass storage in the client. Transfer of messages from a MM to a consuming client happens in the same fashion. The result of this is that no message will cause cause capacity limits to be exceeded, and messages that are extremely large will not degrade performance for other messages that are transferred at the same time.

An additional important feature of this invention is that it does not possess a single point of failure. The failure of any single function in the cluster will not cause the entire system to become inoperative. Many other systems that provide some form of fault tolerance still have dependencies on some system aspect whose failure will render the entire system unusable.

According to a preferred embodiment, the system and the method are set up in a design allowing to accommodate programs that send and receive messages using the Java Message Service (JMS) application programming interface published by Sun Microsystems Inc. The definition of this interface is available at http://java.sun.com/products/jms/docs.html.

BRIEF DESCRIPTION OF THE DRAWINGS

In the following, preferred embodiments of the invention are described with reference to drawings. In the drawings, Drawing 1 shows a typical message system configuration with multiple instances of each type of node: CM, MM primary, MM backup.

Drawing 2 shows a message system similar to the one of Drawing 1, but with two examples of more complex network structures used to interconnect the nodes of the cluster, which structures allow increased network capacity, Drawing 3 represents the internal detail of a Client Manager (CM) node, and Drawing 4 shows the internal detail of a Message Manager (MM) node.

DESCRIPTION OF THE PREFERRED EMBODIMENTS

The structure of a complete message system in shown in Drawing 1. In the drawing, the cluster is represented by a dashed box. The cluster comprises a number of individual machines called nodes. Each node runs a program that constitutes one part of the cluster. There are two types of nodes: Message Manager MMa, MMb and Client Manager CM. A cluster consists of one or more CM'S and one or more MM's. The CM's are responsible for managing client connections. The MM's are responsible for storing messages. The Message Managers of drawing 1 serve different functions. Some Message Managers (MMa Primary, MMb Primary in the drawing) serve as primaries and are responsible for providing all the services of the destination. Other Message Managers (MMa Backup, MMb Backup) serve as backup servers and contain the same destinations as a primary server. The backup servers do not provide any services unless their primary server fails to function. Also in Drawing 1, the network structure of the cluster is visible. This structure is in striking contrast to clusters according to the state of the art, where there are connections from every server to any other server, thus leading to a $n^2$-scaling. In the cluster of drawing 1, a Multicast MessageBus is provided, which connects to every Client Manager and connects to every Message Manager. Therefore, the number of connections scales linearly with the number of servers. By listening to the messages sent via the Multicast MessageBus, the Backup servers maintain the same state as their primary. The clients, of which an arbitrary number can be present, are denoted in the Figure by a "C" enclosed by a triangle. Each of the clients C connects to one client server CM.

Drawing 2 shows two examples of the system of Drawing 1 with some modifications in the network structure. Here, only the differences are described. Instead of one Multicast MessageBus, two MessageBuses are present. This is of course only an example, in practice, any number of MessageBuses may be chosen, the number being adaptable to the specific system. As can be seen in the drawing, each Message Manager (top half of drawing 2) or each Client Manager (bottom half of drawing 2) is connected to but one MessageBus, respectively. On the other hand, each Client Manager (top half of drawing 2) or each Message Manager (bottom half of drawing 2) is connected to all MessageBuses. It is important, though, that in any case a Primary Message Manager is connected to the same MessageBus(es)

as its backup Message Manager. Network structures as the one shown in drawing 2 allow to increase the network speed, since they eliminate the bottleneck of the single Message-Bus. It should be noted that such network structures are only possible because not all nodes are required to communicate directly with each other, i.e. they are only possible in a structure according to the invention.

In the following, the architecture of an individual node is described in more detail with reference to drawing 3, which shows a the architecture of a client manager, and drawing 4 representing the architecture of a message manager. In particular, diagrams 3 and 4 show block diagrams of both the CM and MM nodes, respectively. The architecture at the level shown in the diagrams is very similar for both node types, and they share many common components. Thus, elements occurring in both node types will be described only once. Much of the application specific functionality (the so called 'business logic') is encapsulated in the Session Task of the CM and the Destination Task of the MM. This functionality is well defined in the JMS specification and does not contribute significantly to the uniqueness of the invention, Therefore the internal structure of these blocks is not detailed. Each of drawings 3 and 4 shows the individual functional blocks in the node. These are designated by solid boxes. The functional blocks are divided into modules, which are designated by dashed lines. At the same time the drawings show the flow of control with arrows, and the thread structure with gray boxes.

The module structure of the nodes is intended to subdivide each node into smaller pieces. Each module has well defined responsibilities and the interfaces between the modules are well defined and minimal. This approach helps to manage the complexity of the system and facilitates analysis, design, implementation and maintainability. The interaction between clients and CM's, as well as between CM's and MM's is accomplished by sending commands. The most common type of command is one that contains a message to delivered to some other place in the cluster, but there commands to create new sessions, start and stop flow control, commit transactions, etc.

The Core module contains the application specific functionality of the node. These are the session tasks in the drawing 3 and the destination tasks in the drawing 4. In addition the Core contains all other functions which are must respond to or initiate interaction with the clients or with other nodes. In drawing 3 these are the Session Management Tasl, Log Task, Admin Manager Task, Destination Manager Task, Reliability Manager Task and Config Distributer Task. In drawing 4 these are the Destination Manager Task, Admin Manger Task, Config Distributer Task, Reliability Manager Task, and Log Task. These functions are each described in detail in subsequent sections of this document. The Core is where the different threads of the node interact. The threading model is intended to provide optimal concurrency as described later. This is best illustrated by following the typical paths over which commands travel in the system. Command dispatchers are responsible for receiving incoming commands from clients or other nodes. The command dispatchers are designated by boxes with rounded corners. It is important to preserve the overall order of command arrival until the commands are routed to the individual tasks that will act upon them. This is because the order of command execution within each task must be well defined and repeatable. Commands are thus delivered to the command dispatchers in a single thread to preserve this ordering. The Core must be able to accept incoming commands at any time, so this thread has higher execution priority than others in the system, hence the designation Priority Thread. The command dispatcher does little more than placing the command in the synchronized command queue of the appropriate task. It then frees the thread so that it is available to deliver the next incoming command. The synchronized command queues (not to be confused with JMS queues which are a type of destination) are shown as thick arrows in the diagrams. The commands wait in the synchronized command queues until the corresponding thread task is ready to process them. They also provide a clean interface between threads. There is a danger of data corruption when two threads attempt to modify the same data at the same time. Synchronization refers to a lock mechanism that insures that only one thread at a time is accessing the command queue. The individual tasks in the Core modules are also required to send commands to other nodes, and in the case of CM to clients. In this case the commands are passed to the Client I/O or Cluster I/O module for transmission. This is not done via a synchronized queue, as the task must often block awaiting a reply (usually an indication of success or failure) from the I/O module. The corresponding interface of the I/O modules must be synchronized however. The task must only provide the unique destination or session ID (effectively the address) of the intended recipient. The I/O modules takeover responsibility of routing the commands over the correct connection or channel and using the correct protocol. In some cases a task must generate a command destined for another task in the same node. The Inter-Task Dispatcher is provided for this purpose. It has synchronized command queues to and from each task, and eliminates the dangers associated with direct interaction across different threads.

The Cluster I/O Module is contained in both the CM and MM. The Client I/O module is only contained in the CM. As indicated above, the Client I/O and Cluster I/O are responsible for all of the details of communicating with clients and other node, respectively. Each session is associated with a particular connection, and each destination is associated with a channel. There is no need for the Core to know about channels and connections. For the core it is only important to know the type of the command, and when appropriate, which session or destination it is intended for. The I/O modules contain Command Routers that accept incoming commands from channels and connections and pass them to the correct command dispatcher according to their type. When sending outgoing commands, the Core address the command using the session ID or destination ID of the intended recipient. In order to route outgoing commands to the correct channel or connection, each I/O module contains a table mapping Session ID's to Channel ID's (Client I/O) or Destination ID's to Channel ID's (Cluster). The ID's are unique identifiers that are assigned when each entity is created, and are used throughout the life of the entity to perform command routing. In addition the Connection Management and Channel Management functions keep track of all existing connections and channels. If a connection is unexpectedly closed, or a channel member becomes unreachable for some reason, the Connection/Channel Manager can use the Connection/Channel Table to identify which sessions or destinations depend on that connection/channel, and create commands to notify the sessions/destinations of the event.

Each of drawings 3 and 4 show a Services module. These modules contain a collection of generic services that are accessed by the other modules in the same node. In some cases, the services are accessed by so many other functions, that the control flow arrows stop at the module boundary instead of reaching to all of the individual functions. This is intended to keep the drawing from excessively cluttered. In the MM the Services module includes the functions Thread Pool Manager and Global ID Manager. In the CM the Services module contains the functions Thread Pool Manager, Global ID Manager, Access Control, Destination Service, and Transaction Manager. All of these functions are described in detail in other parts of this document.

In order to achieve high scalability, concurrency issues must be properly addressed. Concurrency refers to multiple activities taking place at the same time. A certain degree of concurrency is implicit in cluster because it consists of multiple computers operating at the same time. The messaging cluster described here requires a much higher degree of concurrency than that provided by multiple computers; it requires each CM session and each MM destination to have an independent flow of control. All modern operating systems support multi treading, which permits multiple threads of control within one program. Because there are practical limits on the number of threads that may be active in a program, and this limit will often be less than the number of sessions or destinations present in a node, a thread pooling scheme is employed. The thread pool manages of collection or pool of threads which will not exceed the number of threads the can efficiently coexist in one program. The threads in the pool will be distributed among the sessions or destinations on an as needed basis.

The thread pooling approach described above—in contrast to giving each session a dedicated thread—is crucial for the following reasons: Failure to allow for the proper level of concurrency can cause the entire cluster to exhibit performance degradation due to one overloaded machine or one demanding client, even though enough resources (CPU, memory, bandwidth) would actually be available. Spreading the functionality of the message server over multiple machines gives rise to a number of situations in which the flow of control in one session may block for a relatively long period of time, while other sessions could continue to execute if enough threads of control are available. Examples of these scenarios are:

Two Phase Commit: Committing a transacted session that is accessing data from multiple MM's requires a two phase commit protocol (internal to the cluster). This can take a long time to complete, as it requires several round trips of communication between the transaction manager and the transaction resources. Since the scope of a transaction is limited to one session, other sessions should be able to execute uninterrupted during this time.

Uneven Load: Despite load balancing efforts, there will be times when individual machines in the cluster will be more heavily loaded that others. Sessions that are accessing data stored exclusively on lightly loaded MM's should not be blocked by sessions that are accessing overloaded MM's.

Very Large Messages: Support for very large messages also give rise to situations where one session may need to wait for a very long period of time while bulk data is being transferred. Other sessions should be able to send and receive smaller messages during this time.

Distributing the client connections over many CM processes provides one level of concurrency. As we anticipate typical deployments to have tens of thousands of clients, and only tens of CM in a cluster, this is not enough. We need many threads within each CM. Indeed, according to the JMS specification, one of the reasons that a single client may create multiple sessions is to achieve concurrency, thus it is essential that the CM be multithreaded at the session level and not at the connection level. On the server, each session must effectively have it's own thread in order to fulfill the requirements described above. Since we expect to handle thousands sessions on each CM, it is therefore not practical to give each session a dedicated thread and to use thread pooling instead.

These arguments apply to the MM as well, except that the unit of concurrency is the destination. Each destination must maintain a well-defined message order, which precludes concurrently executing the commands for one destination. The actions of sessions that interact with common destinations will become at least partially serialized, but sessions that do not access common destinations should be able to interleave their operation without restriction.

In the following, some elements of the node architecture appearing in drawing 3 and drawing 4 and especially the requirements they have to meet are described in more details.

Client I/O and Cluster I/O modules:

These modules decouple the server core from the communications infrastructure. The I/O subsystems serve to hide communication functionality from the core server and help divide functionality more cleanly into separate modules. The specific responsibilities of the I/O subsystems are:

Hiding Connection/Channel details: The functionality of the CM core revolves around the session object. JMS inherently groups together sessions by connection, but connections are a concept of remote communication only. Thus the client I/O subsystem can completely hide the connection details from the rest of the server. It takes on full responsibility for opening and closing connections, as well as storing all state and properties associated with the connection itself. It must, as well, provide a means to map session ID's to connections so that the session objects can communicate with their corresponding clients without the need to maintain connection information themselves. Likewise the Cluster I/O hides all details of the channels (ibus topics) used to communicate with the MM's and provides a mapping from destination ID to channel.

Authentication: This is the act of verifying the identity of the client using name and password or a digital certificate. This is primarily relevant for Client I/O, but could be extended to Cluster I/O if there is a requirement to insure the identity of nodes joining the cluster. (This level of control is expected to be provided by employing firewalls or otherwise isolating the cluster network.)

Connection Access Control: (Client I/O only) Client I/O will reject connections from clients who are not authorized to access the message server.

Command Routing: The I/O modules are responsible for two aspects of command routing. For each inbound command they must identify the command type and route it the appropriate dispatcher. For each outbound command they must identify the type and the session or destination ID, and use these to determine the channel or connection over which to send the command.

The Core:

The core is the most central part of the node. It contains the command dispatchers, command queues and command handler tasks. It is the bridge between the single threaded world of command dispatching and the multithreaded world of the task objects that handle commands. As stated above, the I/O modules are responsible for routing commands based on their type. For each command type, there is a command dispatcher. Many of these command dispatchers are very simple and do nothing more than take each command and enqueue it into a thread safe queue. The Session/Destination Command Dispatcher is a bit more complex. It dispatches to many session tasks, so it must examine the session ID contained in the command, and place the command in the correct queue. The Inter-task Dispatcher is similar to the Session Command Dispatcher, but adds the aspect that commands are submitted to the dispatcher via multiple thread safe queues. It allows the various tasks to send notifications to each other without requiring excessive synchronization or creating race conditions.

The thread safe queues form a safe bridge to the pool of threads, which executes the collection of tasks. Each queue is configured with a 'high water mark'. This is the maximum number of commands that are allowed to accumulate in a queue before flow control will be engaged for that session or destination. See the section on flow control below for more information.

The task collection consists primarily of a multitude of session tasks. In addition, each CM will have exactly one task responsible for each of: Session Management, Destination (Proxy) Management, Reliability Management, Configuration Data Distribution and Administration. Each MM will have exactly one task for responsible for each of: Destination Management, Reliability Management, Configuration Data Distribution and Administration. All of these tasks are registered with the Thread Pool Manager, which will distribute a fixed number of threads among all of the tasks that have commands waiting to be handled. All tasks must implement the interface necessary to be run by the thread pool, but they need not be aware of the thread pool itself.

The specific responsibilities of each type of task are:

Session Management (CM): Creating new session tasks and registering them with the Session Command Dispatcher and the Thread Pool.

Destination Management (MM): Creating new destination tasks and registering them with the Destination Command Dispatcher and the Thread Pool.

Destination Management (CM): The Destination Service of the CM maintains information about the destinations with which that that particular CM interacts. The Destination Manager task processes destination commands that arrive from the cluster and use this to keep the Destination Service up to date. Destination commands include creation and destruction of destinations, plus flow control status.

Session Task (CM): This encapsulates the functions of a JMS Session: Managing consumers and producers, publishing and consuming messages, managing transactions, access control, etc.

Destination Task (MM): This encapsulates the functionality of a JMS Destination: storing and distributing messages, managing consumers and their message selectors, committing transactions, etc.

Admin Manager: The Admin Manager is the central coordination point for administration of the various modules and services in a node. Each module that requires administration can register a handler with the Admin Manager. In the CM, the session command dispatcher dispatches admin commands, because these commands are routed to the CM through an ordinary topic with a reserved name and ID. (See the section on Administration below.) In the MM, admin commands have a separate dispatcher, as the MM does not otherwise subscribe to topics hosted in other MM's.

Config Distributer Task: This task listens for requests for configuration data from new nodes. It is a critical part of the system that insures that all nodes use consistent configuration data. A newly started node will request confirmation that it's configuration data is consistent the nodes already running in the cluster. The Config Distributer Task of each running node will confirm or deny this. If the new node determines that it's config data is not consistent, it will request the config data from one existing node. The Config Distriburter Task from that node is responsible for providing this data.

Reliability Manager Task: This task is responsible for monitoring view change events (nodes or clients appearing or disappearing) delivered to the node by the I/O subsystems. It must take appropriate action if necessary. Typical action in the CM will be to close all consumers that listen to destinations that no longer exist. Typical action in the MM is to close consumers that belong to session on CM's that are no longer reachable. In a backup MM the Reliability Manager Task manages the fail-over process when the primary MM fails.

The Destination Service:

The Destination Service provides essential information about the destinations with which a CM interacts. It is responsible for:

creating/locating destinations of messages that are being published, in the case of destinations that are previously unknown to the CM maintaining a list of known destinations with corresponding names, ID's, flow control status and access control lists maintaining a mapping between destinations and sessions that have producers for those destinations or have been publishing to them in the past. This information is essential to the forwarding of flow control messages.

The Thread Pool Manager:

The Thread Pool Manager maintains a list of tasks that are to be run in different threads. It maintains a collection of threads that may be smaller than the total number of tasks. It is able to detect if each task needs to run and it will distribute the available threads among these tasks, insuring that each task runs in only one thread at a time.

A critical feature of embodiment of the invention described above is that it allows for a globally unique ID generation.

Many classes of object will be required to have ID's that are globally unique throughout the cluster. These ID will be used to uniquely identify these objects such as messages, sessions, destinations, consumers, and nodes. For example, when a destination decides to distribute a message, it must uniquely specify the consumer to which the message must be delivered using it's ID. Each message must have a unique ID so that it's identity is never confused with another message as it is routed through the nodes of the cluster. Generation of unique ID is trivial in a monolithic server, but complex in a cluster as no two nodes in the cluster may be permitted to assign the same ID. A unique ID can be generated locally by each node using a combination of the following values:

IP Address (perhaps limited to subnet address): All computers that support the Internet Protocol (IP) for network communications have an IP address that is guaranteed to be unique on the local network. If a computer is directly connected to the public internet, this address is guaranteed to be unique worldwide. Computers in a messaging cluster will often be on an isolated network, which may use non-unique IP addresses (usually in the address block 192.168.xxx.xxx). In this case a configured site ID is required to insure that messages routed to other message servers on different isolated networks always have a unique message ID.

Site ID: In the case that non-unique (internal) IP addresses are used, the ID can be made globally unique by adding a configured site ID.

Port Number: All computers that support the Internet Protocol (IP) for network communications support the concept of ports. A port specifies one of many possible specific destinations for data delivers to a computer over an IP network. When an application requests to listen on a an IP port it will always be assigned a port number that is unique on that computer. This insures that two nodes running on the same computer will generate a non-overlapping set of IDs.

Locally generated sequence number: The values above will identify a node uniquely. To identify the individual sessions, consumers, and messages, a sequence generator will be maintained for each of these. A sequence generator may start with zero and must be incremented each time an ID is assigned.

Start Time: When a node is shut down and restarted, the sequence generators may be reset to zero. By adding the time that the node started operating, there is no chance of ID being reused.

These values should be stored in a data structure that is compact and efficient to use for comparisons and hash code generation. One or more long integers or an array of byte are ideal choices. The structure must allow enough storage capacity for compact representations of all of the values above, including enough capacity for sequence number for all of the IDs that may be generated between restarts of a node. (Alternately, the Start Time may be updated if the sequence generator overflows.)

Only cluster nodes should generate unique IDs. It is difficult to insure that a client would generate truly unique IDs using the method described above (especially in the case of potential non IP clients that connect via IRDA, SMS WAP or other protocols). Client should obtain unique ID from the server to which they are connected.

One of the main advantages of the invention is that it allows for a system to handle very large messages. In the following, a short overview over very large message handling using a system and a method according to the invention is given.

A Very Large Message (VLM) is one that is too big to fit into RAM, or at least too big to be handled efficiently in one piece. Unlike smaller messages, which can be embedded directly into a single publish command. It would be desirable to transfer these large messages file to file using ftp or a similar protocol. This would not be sufficient, however. Firewall restrictions may block the additional protocol, even though the JMS connection is permitted (or the JMS connection is tunneled through http). This could also lead to a proliferation of connections. Lastly, data transfer between the CM and MM must be multicast to achieve high availability using the method described below.

Very large messages must be sent from the client to the CM over the same connection that is used for other session commands. The VLM must be multiplexed with other connection data so that it does not block other sessions that use that connection. This can be achieved by fragmenting the VLM stream and sending each piece as a separate command. While small messages can be sent in a single command, VLM's will be sent as a chain of commands, each carrying the next part of the message. The CM will need to send these fragments to the MM in the same way over an iBus multicast channel. It must begin sending to the MM before the last one is received from the client, as it cannot assume that the message will fit in memory. The CM can also employ a disk buffer to temporarily store the VLM fragments and insure that the client session is freed as soon as possible.

Consumption of messages works in a similar fashion, with the MM sending the message to the CM in fragments, and the CM forwarding the fragments to the client.

It is important to note that VLM's, as they are defined here, cannot be sent or received by a JMS client using the standard API, which implicitly assumes that messages can be passed as single objects. The use of VLM's would require a non standard client method, which pass or receive I/O streams, or a non-standard message type, which can embed a handle to the stream in the message object. This implies that the JMS conformant client library used for the embodiment of the invention described here is proprietary and specific to the server implementation according to the invention. As such it is an integral part of the messaging system described here.

Flow control is an essential feature of a message server that allows it to maintain integrity under heavy load. Flow control refers to the ability of a cluster to instruct message producers to stop producing if system resources (particularly memory and persistent storage space) are running low. It also refers to the ability of clients to instruct the server to stop distributing messages to it until it has the capacity to accept more. The implementation of flow control must insure that system resources are never exceeded yet not it must not unnecessarily degrade system performance.

There are two levels of flow control: transport level and application level. Transport level flow control is provided by the communications protocols in use. In the case of the cluster these are tcp and iBus//MessageBus. It is undesirable to rely on transport level flow control, since there will be a variety of commands multiplexed over each connection or channel. One slow receiver would cause transport level flow control to block all traffic on the shared connection/channel. Also, when transport level flow control is triggered, then there is data stored in internal buffers that is no longer accessible to the sender and not yet available to the receiver. It is undesirable for this data to remain 'in transit' for an extended period of time until flow is resumed.

It is more desirable to rely on application level flow control. Since this form of flow control is part of the application it can propagate flow control signals all the way to the source of commands (usually a client or destination) before flow is actually stopped. If these signals are propagated early enough, it is possible that commands that are stored in intermediate buffers can be processed before transport level flow control is engaged.

Application level flow control also allows the application to have more specific knowledge of the flow state. A queue that knows that a particular consumer is blocked can choose to distribute messages to other consumer instead of blocking or allowing the consume command sit in intermediate buffers for an indefinite period of time.

Destinations need to know when the sessions of its consumers are blocked. Queues can use this information to distribution messages more effectively. Topics can decide to stop distributing until all consumers are unblocked.

It would be helpful for producer appliactions to be able to know when a destination is blocked. They can then publish to other destinations or do other task instead of blocking. The JMS API does not support this, but features could be added; for example: isBlocked(Destination), trySend( )/tryPublish( ), or an IsBlocked exception for the existing send( ) and publish( ) calls.

Flow control should be propagated proactively and asynchronously, so that intermediate queues have a chance to flush before downstream blockage occurs.

If proactive flow control propagation works as desired, CM sessions do not need to explicitly deal with flow control. In reality, transport level flow control can still occur. The CM session writes data to one client session and multiple destinations. If one of these is blocked at the transport level, the session should not necessarily block. The session should process commands in order, but the destinations and clients operate asynchronously (relative to each other), so there is no absolute ordering of commands from the two sources: client and cluster. The Session Task should have multiple input queues, one from the client, one from the cluster, and possibly a separate one for flow control commands from destinations. It can peek at the first command in each queue, and select the one that has the highest likelihood of succeeding based on the flow control state that it knows about.

The CM session can also be the originator of flow control commands, in the event that commands are building up in its input queues faster than it can process them.

Application level flow control is implemented using additional commands that travel over the same routes as the data that they control. This makes it essential that these commands are sent proactively, e.g. early enough to reach their destination before low level flow control is invoked or system resources are exceeded.

The table below lists the application elements that can issue flow control commands, and to where those commands need to be routed.

the cluster will be available at all times. The most fundamental measures to insure high availability consist of designing server applications that can run continuously without the need to go offline for regular maintenance, and executing high quality implementation to reduce the possibility of unexpected downtime. Despite these measures, the possibility of hardware failures can never be completely eliminated. For this reason, the most ambitious high availability schemes always employ redundant hardware. The same service must either be provided simultaneously on multiple computers, or the service is provided on one machine with one or more additional machines configured as 'standby' replacements which can takeover at any time. High availability is achieved because the likelihood of multiple computers experiencing hardware failures within a given time period is significantly lower than the likelihood of a single computer experiencing a failure in that time period. Due to the communication overhead involved in co-coordinating the simultaneous distribution of messages from multiple computers, the invention described here implements the latter scheme (one primary, one or more standbys). One of the unique features of this inventions is the ability to support any number of backups for each primary, so that the likelihood of the primary and all backups failing within a given time period can be reduced to any degree desired.

High availability is an issue primarily in the Message Manager, as this is the only part of the system that is responsible for storing messages persistently. The Client Manager does not store critical state information, so the failure of a CM is relatively easy to deal with. The fail-over procedure for a CM will be discussed first. All subsequent discussion will concern the MM.

High availability of the client manager:

The CM stores only transient state information. Unlike the messages stored in the MM's, none of this state is expected to survive a node restart. For this reason it is not necessary to maintain redundant copies of this state on other CM's. If a CM fails, all clients connected to it will immediately detect that the connection is broken The client library will automatically reconnect, and the connection balancing

| Who is blocked | Who needs to know | How stored | How propagated |
|---|---|---|---|
| Client session consumer | Destinations of all consumers in that client session CM session | Consumer table in destination Flag in CM session | Client -> CM session -> CM Destination Service -> All Relevant Destinations |
| Destination | CM sessions that are likely to publish to this destination Client sessions that are likely to publish to this destination | Lookup table in Destination Service of CM Lookup table in client | Destination -> CM dest manager -> CM destination service -> All relevant CM Sessions -> All corresponding clients |
| CM Session, client input | Client session | Flag in client session | CM Session -> client |
| CM Session, destination input | Destinations of all consumers in that session | Consumer table in destination | CM session -> CM Destination Service -> All Relevant Destinations |

Achieving high availability is, along with increasing capacity, one of the primary goals of clustering. High availability refers to a guarantee that the services offered by logic will reconnected it to any other CM that is still operating. After connection, the client must recreate each session. Parameters in the command to create a session can indicate that this is a session that ran previously on another CM and is being resumed. The client will provide information on the last messages that were acknowledged by each consumer, and the last sent messages or transactions that were completed by each publisher. The client must restart incomplete transactions and resend unconfirmed sent messages.

When a CM fails, all MM's that had been interacting with that CM will be notified by the group membership protocol in the MessageBus. The MM must delete all consumer entries associated with the sessions on that CM so that it does not try to distribute messages to clients that are not reachable. These entries will be recreated when the client reconnects. The MM must also rollback any messages that were part of an uncommitted transaction of any sessions of the defunct CM.

High Availability of the Message Manager:

The use of a multicast protocol to transmit data across the network is essential to the High Availability scheme, as this permits data to be shared between a primary MM and all of it's backups without wasting network bandwidth In order to conserve resources, one iBus multicast channel will be shared among all of Destinations in one MM. This makes it logical to make the MM the basic unit of fail-over, and not the individual destinations. The embodiment of the invention should allow multiple MM's to exist within one JVM, so that fail-over can be used to selectively migrate part of the load from one machine to another.

The individual processes that are required to implement High Availability are described below:

Designation of the startup role: For each logical MM, the cluster may contain one primary and any number of live backups. As each MM starts it must determine whether or not it is the primary. This can be explicitly specified, for example in a configuration file, however any fail-over scheme will cause a backup to become a primary if no other primary is found within a certain period of time. Likewise, if a backup becomes primary because the previous primary was temporarily isolated, then there will be 2 primaries as soon as the original primary is reachable again. In this case these 2 must negotiate to determine which will be demoted or stopped. This means that the fail-over scheme and the order of node startup will ultimately determine the role of a new MM node, and not the system configuration. See the discussion of fail-over below.

Synchronization of a new backup Message Manager: This scenario assumes that a primary and zero or more backups are already live. A new MM is started, determines that it is a backup, and must synchronize it's state (directly or indirectly) with the primary. Once it is synchronized, it can remain up to date by monitoring the multicast communication between the primary MM and the CM's.

The discussion below uses these names to identify the three different parties that could take part in the synchronization. Depending on context they refer either to an MM, or one of the Destination Tasks on that MM.

Primary: The existing MM which is currently operating in primary mode

Host: The existing NM which is providing the state to the target MM. This is either the Primary or a backup that is already synchronized.

Target: the new backup MM which needs synchronization.

The target MM begins collecting, but not processing, destination commands as soon as it comes online. These are passed to the Command Dispatcher, which accumulates them in a generic queue until its Destination Tasks are created. The target makes a request to locate the primary and any backup that can provide synchronization. From the list it receives it selects one (for performance reasons, preference should be given to a backup over the primary). Once negotiation is complete and the selected MM has agreed to be the synchronization host, the target requests a list of destinations from that host. The target creates these destinations, with command processing disabled, and registers them with the Command Dispatcher so that it can begin accumulating commands in the input queues dedicated to each destination. The following process is then executed for each destination, one at time. It is necessary that all commands sent on the multicast channels in the course of normal message processing contain the unique id of the session or destination that sent it, and a sequence number. It also necessary that the multicast protocol is atomic (either all listeners receive each command or none do).

Processing of incoming commands is suspended in both host and target destination. Commands continue to be accumulated in the incoming queues of both destinations during this time.

The host destination externalizes its state. This state includes all of the messages currently stored in the destination, plus a table containing the sequence number of the last command received from the primary destination and the sequence number of the last command received from each session that has communicated with the destination.

The host destination may resume processing commands when the previous step is complete.

The externalized state is optionally compressed and then transmitted to the target via a point to point protocol.

The target internalizes the state.

The target begins processing incoming commands, but must compare the sequence number of each command to corresponding sequence number in the table received from the synchronization host.

If the sequence number of a command from a session or the primary destination is less than or equal to the corresponding sequence number received from the synchronization host, the command is ignored.

If the sequence number of a command from a session or the primary destination is one grater than the corresponding sequence number received from the synchronization host, the command is processed and comparison of sequence numbers may be discontinued for this session or primary.

The arrival of a command from a session or the primary destination with a sequence number that is more than one greater than the corresponding sequence number received from the host represents an error condition that is not possible if the underlying transport medium is providing atomic ordered multicast.

Maintaining a synchronized backup: Once a backup is in sync, it can process commands coming from sessions normally. It does not distribute messages however. It will also process incoming commands that were sent by the primary MM and update its state to remain in sync.

If a backup MM detects that it has lost synchronization due to excessive message loss (possible if it has been disconnected from the network and declared dead by the remaining members) it should change it's state to unsynchronized, and repeat the startup procedure.

MM Fail-over:

Fail-over is the process of promoting a backup MM to be primary when the original primary MM fails. It consists of the following steps:

Recognizing that the primary has failed: The iBus//MessageBus Group Membership services, generate an event for all other channel members when one member leaves the channel intentionally or unintentionally. The backups MM's will be notified when a node on their channel fails, and they must read application tag to see if the failed node was their primary.

Designating the new primary (in the case of multiple backups): The backup MM's exchange their status with regard to synchronization. Of the up-to-date backup MM's, specifically the one with the lowest channel rank, will become the new primary.

Switching the designated backup into primary mode: The backup must change state and begin processing as a primary. Message distribution is started.

Multiple Primaries:

If the failure of the primary was due to a temporary network outage, the original primary could reappear at any time. One of the primaries must then revert to backup mode. The primaries compare their state by exchanging the set of sequence numbers from all commands published on the MM channel. This gives them the chance to determine which primary is most up-to-date. The most up to date one remains, any others revert to backup mode. If multiple primaries are fully up-to-date, then the one with the lowest rank remains primary.

Network Partitioning:

This is a catastrophic situation, in which a primary MM and all of its backups may become unreachable at one time. In this situation normal processing cannot continue, but the cluster should insure that no rebroadcast storms result, and that normal processing can resume once the network is restored.

The invention is intended to support transactions at the session level as described n the JMS specification. Transactions are commonly associated with, but not limited to, the field of databases. Transactions, in the data processing sense, insure that a group of actions will be carried out atomically and that their results are persistent. Committing a transaction is the crucial last step when all of the individual actions that comprise the transaction are effectively carried out. There are exactly two possible results of a commit: either all of the individual actions are carried out and their results are persistently recorded, or, in the case of exceptional conditions, none of the actions are carried out and the net effect is as though the whole transaction never occurred. The latter case is referred to as a rollback. The classic example is a bank account transfer, in which case there are legitimate circumstances in which the whole transfer may fail (insufficient funds, etc.), but under no circumstances may one account be credited without the other the other being debited. In the specific case of JMS messaging, the sending and receiving of messages in one session within the bounds of one transaction are not effective until committed. In the case of a rollback, published messages are never delivered, consumed topic messages are discarded, and consumed queue messaged are redistributed to other recipients. Clustering causes the implementation of transactions to become more complex than is the case in a monolithic server. This is true, because the atomic characteristics of the transaction must be enforced for actions that are distributed over several computers. This results in a distributed transaction, and the extra coordination required to execute it is commonly implemented by a 2 phase commit protocol. In a 2 phase commit, one entity acts as the transaction manager. In the first phase the transaction manager requests a guarantee that each of the transaction participants is capable of successfully executing the transaction. In the second phase, the transaction manager instructs the participants to actually perform the commit or, if not all participants were able to offer a guarantee of success, to rollback the transaction. JMS transactions must occur within one session, and they encompass all messaging activity that has occurred within that session since the last commit. For this reason the session tasks in the CM act as transactions managers. The transaction participants are all of the MM destinations with which that session has interacted during the current transaction. Transaction management is a common piece of functionality that may be employed by all session tasks. For this reason it is depicted as a separate box in the Services module in drawing 3 which shows the internal structure of the CM.

The specific steps executed in the processing of a transaction are:

Produce Message: This occurs in a fashion similar to the non-transacted case. The producer sends the message and continues processing without waiting for a reply from the server. The CM passes the message to the appropriate MM, where it is stored marked as uncommitted. The CM adds the message ID to the list of produced messages for the open transaction of the corresponding session.

Consume Message: The MM sends a message to the CM, which forwards it to a consumer. The CM adds the message ID to the list of consumed messages for the open transaction of the corresponding session. The message continues to be stored in the MM where it is locked until the MM received either a commit (equivalent to an ACK) or a rollback.

Commit: The list of produced and consumed message IDs for a session should be organized by destination. The CM sends a COMMIT command containing the lists of produced and consumed message ID's for all destinations. The list of consumed message ID's is that which is provided by the client. The one stored in the session may contain messages that have not yet been delivered to the consumer. If only one destination is involved, this may be a 1 phase commit, and the CM may synchronously wait until the reply from that destination arrives. If more than one destination is involved then a 2 phase commit is needed. See below for more details.

Rollback: The CM sends a ROLLBACK command containing the lists of produced and consumed message IDs for that destination. The list of consumed message ID stored in the session is used, as the message store should be returned to the state it had at the beginning of the transaction.

Two Phase Commit:

A simple two phase commit protocol may be used to commit transactions across multiple destinations. The requirements of JMS transactions are less demanding than those of many other transactional systems. Transactions occurring in different session have no interdependencies and since one producer may not produce in more than one session, JMS sets no restrictions on the relative ordering of messages from different transactions.

The CM, which handles the session that is conducting the transaction, acts as the transaction manager. The steps of a 2-phase commit are:

COMMIT_PREPARE command request is sent to all MMs and lists all of the destinations involved in the transaction and the id's of the consumed and produced messages per destination, as well as a unique transaction ID.

The Destination Command Distributor distributes copies of the command to each destination that is involved in the transaction.

Each destination checks that all produced messages for which it is responsible are available in the message store and have uncommitted state. It checks that all consumed messages for which it is responsible are in the message store and are locked by the session of the transaction. If so, it sends a reply containing COMMIT_READY and a list of destinations. Otherwise it sends a COMMIT_FAIL message. If the MM has no destinations involved in the transaction, then it sends a COMMIT_READY message containing no destinations.

If the CM receives COMMIT_READY from all involved MM's, then it sends a COMMIT_FINAL message to the transaction channel, containing the transaction ID.

The Commit Manager in each MM forwards the COMMIT_FINAL message to each destination involved. Each destination changes the state of the committed messages and returns COMMIT_COMPLETE. If the MM has no destinations involved in the transaction, then it sends a COMMIT_COMPLETE directly.

After all COMMIT_COMPLETE messages have been received, the CM returns a success message to the client.

If the CM receives one or more COMMIT_FAIL messages in response to the COMMIT_PREPARE, or one or more of the destinations times out, then it sends COMMIT_ROLLBACK messages to all involved destinations and notifies the client of failure.

The Role of Backup Processes in Two Phase Commits:

There are several options for the role that backup MMs can play the commit process. They range from the optimistic extreme of not including the backup in the commit procedure, to the conservative extreme of failing a commit if any backup fails.

The conservative route incorporates a high risk of causing performance problems. It means that any backup MM, which is not contributing to the function of a normally running system, can cause a delay a transaction or cause it to fail if it is not functioning properly. This would mean that the increased redundancy that comes from multiple backups can detract from system performance and possibly make the system less reliable than a monolithic server.

The optimistic route implies that an unlikely failure scenario could lead to message loss. When a JMS client successfully returns from a commit, that commit would be guaranteed successful on the primary, but not on the backup. Atomic multicast guarantees that the backup will receive all commands in the event of primary failure, as long as there is at least one surviving channel member that had received all commands. This means that the backup will eventually receive all commands. Thus, in the scenario that a primary commits a transaction and then fails, it is very likely that the backups receive all command, but a resource problem on the backup, such as a full disk, could still lead to message loss.

The optimum solution is to require some, but not all, of the redundant MMs to succeed with the commit. This means that the primary plus a least one of the backups must commit for the commit to be effective. The fail-over protocol will insure that only an up-to-date backup (one that has processed all transactions) is allowed to become primary.

Although it is not a feature specified by JMS, the ability to perform wildcard subscriptions is a very useful convenience. This is the ability to subscribe to a large number of topics in one step by simply specifying a text pattern that matches the names of all of the desired topics instead of subscribing to each topic individually. Users of a messaging API very often find this feature helpful, and sometimes even essential. The use of this technique can eliminate the need to make individual subscriptions to hundreds of individual topics, and can insure that new topics that match the subscription criteria will automatically be subscribed to on behalf of the client.

Wildcarding can be implemented mostly in the CM. The consumer must send a subscription request to the CM that contains a wildcard string. The string can use a 'glob' style wildcard pattern (*?) or a regular expression (for power users—there needs to be an indication of which method is being used). The CM is not expected to maintain a list of all destinations in existence, just those with which it currently interacts. The CM must 'broadcast' a message to all MMs requesting the names of all destinations that match the pattern. This is a variation of the basic command required for a CM to locate a destination. The CM then generates normal subscriptions to all of the destinations returned.

The wildcard functionality includes the ability to automatically merge in new destinations that are created after the original subscription was made, if their names match the subscription pattern. This means that each time a new destination is created, it must advertise itself to all of the CMs in so that they can compare its name to their list of wildcard subscriptions.

Typically, a newly installed message server contains no destinations. Destinations are created to suite the needs of each individual server installation. In order to facilitate certain internal functions of the cluster, however, the invention defines certain special destinations which must exist in every installation. These destinations have pre-defined names, and are referred to here as 'well known' destination names, in that the internal functions that use them may begin to access them at any time whiout the need to explicitly create them or to test for their existence.

Other parts of this document will describe the soecific purpose of each well known destination. The names begin with underscore characters. To avoid name conflicts, ordinary clients will not be permitted to create destinations with names that begin with underscores. They will usually have special access control restrictions. The well known destinations include:

_ADMIN—The topic for administration commands
_LOG—The topic for storing and distributing log messages
_DMQ—The Dead Message Queue Virtually all computer systems posses parameters that must be defined before the system can operate properly. Many of these parameters are used to tune the performance of a particular installation of the system to the specific purposes for which it is used. Often network address parameters specific to the installation must be supplied. For these reasons, such parameters must be configurable by the administrator of the system. This is often accomplished using data files containing values for the configurable parameters. System administration includes, but is not limited to, the setting and updating of these parameters. These two areas, configuration and administration are closely related, as online administration commands can override values specified in configuration files. Often such values must be updated in the configuration files so that changes made online persist after node restart. Many aspects of administration affect multiple cluster nodes simultaneously, which adds an extra degree of complexity compared to the case of a monolithic server. It is necessary to insure that updates that affect multiple nodes are carried out on all affected nodes, and that these changes are updated in their configuration files in a synchronized manner. The case of nodes which join the cluster late or are not live when updates are made are also considered.

Administration:

The administration subsystem is a generalized framework for remote server administration. Any other subsystem in the server may register a handler with it and thereby expose its own set of administration commands to the administration client. The nature of administration commands is such that some commands are relevant only to an individual node, some are relevant to a subset of nodes, and some are relevant to all nodes. Some examples are:

One node: browse a queue (MM primary)
Subset of nodes: delete a message (MM primary and backups), update user list (all CMs), get list of destinations (all MMs)
All nodes: get status Some commands require a reply, which, in the distributed case, is actually a composite of the replies from many nodes; for example "get list of destinations".

Administration of the cluster is achieved by adding an Admin Manager to each cluster node. This Admin Manager will act like a session that is not associated with a client. When it is created it will create a consumer for special topic _ADMIN, and await administration commands on this topic. Since access control can be defined per destination, the _ADMIN topic may be a normal JMS topic. The Admin Managers will be 'internal clients' within the cluster. An administrative client application is an ordinary JMS client, and the lowest level of the client Admin API is the definition of a set of message formats.

The sending of replies to the admin client can be handled by specifying a replyTo topic with each command that the client sends. The difficulty with receiving replies is that a JMS client cannot know how many nodes are active in the cluster, and thus not know how many replies to expect. Waiting for a time-out after each command is not practical. Either administration clients must be designed to function well despite an unknown number of asynchronous replies, or the replies must contain some cluster internal information indicating the total number of replies to expect. The former is not an attractive option, since the admin API will be available to customers and the semantics should be kept simple. The latter is possible, but the cluster design does not explicitly require most subsystems to know the overall structure of the cluster. Nevertheless, this information can be made available to the Admin Manager.

The Admin Manager will act like a JMS client that lives inside the cluster. In this way, it can leverage the existing messaging infrastructure to communicate with the admin client. In the CM, the Admin Manager can be implemented as a special subclass of a Session Task which is automatically created during node initialization and which is not associated with any client connection. Integrating the Admin Manger into the MM is a bit more complex, since MM's do not automatically listen for commands from other MM's. In this case an extra element is needed: an Admin Dispatcher that will listen for commands on the channel of the _ADMIN topic, and pass them to the input queue of the Admin Manager.

Configuration:

Configuration data is generally required in the early stages of starting a node. For this reason is a good idea to use a local file to store configuration data which insures that a node can always (re)start and integrate itself into the cluster without depending on the operational state of any other server. The configuration system used in the cluster must recognize online changes made to configuration parameters via the admin API and update the configuration file to reflect these changes. Additionally, it must insure that the updates remain consistent across all nodes.

For our purposes, all data files required by nodes (configuration, users, ACL's, etc.) will be considered configuration files. Let us also divide the parameters into two categories:

1. Essential Parameters: those that are essential in order for a node to start, contact other nodes, and initialize the Admin Manager
2. Acquirable Parameters: those that could be acquired from other nodes after the steps above are complete Handling essential parameters: Parameters in the each category should be stored in separate files. For the essential parameters, the files should be identical for all nodes, and should not be updated online by the Admin Manager. An administrative procedure should be in place to insure that all nodes have identical copies of this file. An example of this is editing only a master copy and using UNIX rdist or a similar utility to push it to the individual nodes. Storing the file on central network file system is not an acceptable option as this introduces a single point of failure.

The cluster can support immediate detection of inconsistent configuration files using the following procedure:

When a node is initialized, it creates a digest of the configuration file that it read. This may be a simple checksum calculation.
The node requests the corresponding digest from all other nodes.
If the node's own digest and all those received in response to the request are not all identical, then and error message is generated and node startup fails.

Handling acquirable parameters: In order to assure consistency across nodes, acquirable parameters should be updated either:

off-line by editing the configuration files, when no nodes are active
online by issuing commands from an admin client when one or more node is active When online modifications are made, nodes that are not online at the time will have 'state' configuration files. During initialization, a node should perform a consistency check similar to that described above for essential parameters. In the case that the node detects that it's configuration file is state, it requests that the entire configuration file be sent to it from another node which was already online before the node in question started. It then uses this file for configuration, and rewrites it's local configuration files.

This procedure works if files are not permitted to be edited off-line when the cluster is active. If off-line editing were allowed, then inconsistencies could be detected, but it could be difficult to determine which file version is more correct. Using the last modified date of the file is not sufficient, because both files may have changed since they were last in sync, and a merge may be necessary. The use of a revision control system could allow such merging to be done automatically, but would introduce a single point of failure. The most robust solution is to rely on a certain degree of administrator discipline and disallow manual file updates when the cluster is running.

Event logging is a common aspect of all server systems. In the course of operation of a computer system, the user of the system must be notified that certain events have expired. These event may include warnings of undesirable circumstances of confirmation that certain critical stages have been reach. They can include any information that may be of interest to the user. An interactive desktop application will usually print a message to the computer display. A server system, in contrast, runs continuously day and night without a user constantly viewing the computer display. Often the computer has no display and is located in an isolated area. The most common practice is to write such notifications to a data file. During system design, it is difficult to determine the best means of recording events for a particular system installation. Therefore it is desirable to have a generic event logging service which can be configured to record event notifications to one or more of several possible places.

A log task will be available in each node so that information about important events or error conditions can be recorded. As a minimum, this information should be written to a local file for each node. It is, however, difficult to track events that involve different nodes when each nodes log data is in a different file. Because of this, log messages are to be published to a well-known topic (_LOG), so that they are stored in a fault tolerant manner and can be monitored using a JMS client. All nodes should have well synchronized clocks, so that the consolidated log messages can be accurately ordered. (Other aspects of the cluster should not be highly sensitive to clock synchronization.) Although event logging is, from a logical point of view, a generic service, it is depicted in drawings 3 and 4 as part of the Core modules in both the CM and the MM, and not in the Services module. This is because the logging function is a task that should have its own thread. This is done for performance reasons, as logging will almost always concern writing data to disk, network or some other slow device. Doing this in a separate thread allows a large amount of information to be recorded without unnecessarily slowing down the task that generated the information.

The Dead Message Queue is a well-known queue that is provided for use as the destination of messages for which the ultimate disposition is not clear. These may be messages that have remained undeliverable for an excessively long period of time, or are undeliverable due to error conditions. It may also be desirable for messages that exceed their normal time to live be sent here. The DMQ behaves like a normal queue, except for the fact that clients are restricted from publishing to it directly, and the messages contained in the DMQ must indicate their original destination and the reason for being sent to there.

Finally, it should be noted that the system and the method described above are merely examples of a system and a method according to the invention. It goes without saying that the skilled person may implement a large variety of different embodiments without leaving the scope of the invention. Specifically, the following things are not part of the invention and can vary arbitrarily across different deployments of the invention:

computer hardware on which the software runs

The number of computers used in the cluster and allocation of CM nodes, primary MM nodes and backup MM nodes among those computers.

The type and configuration of the network that interconnects the nodes in the cluster The type and configuration of the network(s) that connects clients to CM nodes The client application that interacts with the JMS compatible message library The means for determining to which CM a client should connect in order to balance the load among all CM nodes. (There is a large variety of existing hardware and software solutions for this which are appropriate.)

Described herein is a computer program product comprising a computer usable medium having computer readable program code means embodied therein for enabling a computer to serve as a client manager in a server cluster, the program product comprising computer readable code means for enabling the computer:

to establish a connection to a message client, to communicate with at least one message manager nodes with means for storing messages and at least one destination across a multicast communication channel to receive a message from said message client, and depending on the content of said message, to transmit message data across said multicast communication to at least one of said message manager nodes, said message comprising a destination information addressing a destination, further comprising computer readable code means for enabling the computer:

to receive message data containing a client information from a message manager node, and to transmit, depending on the content of said message data, a message to the message client addressed by said message data.

Also described herein is a computer program product comprising a computer usable medium having computer readable program code means embodied therein for enabling a computer to serve as a message manager node in a server cluster, the program product comprising computer readable code means for enabling the computer:

to communicate with at least one client manager across a multicast communication channel, to receive message data from said client manager node, said message data comprising a destination information addressing a destination, depending on the destination information, to store said message data, to maintain a list of client subscriptions, and to compare the list of client subscriptions to available messages, and, when there is a match, for transmitting message information with a client information to a client server across said multicast communication channel.

GLOSSARY OF TERMS USED

Cluster: A group of processes that run on more that one computer that work together to act like a single message server, but with increased performance and reliability.

Node: A single logical process within a cluster. Often a node will correspond to a single computer, but this not strictly the case. Multiple nodes sharing a computer will interact with other as though they are on different computers connected only by a network.

Monolithic Server: A complete message server running as a single node. To a client, a cluster is functionally equivalent to a monolithic server.

Server Instance: Generic term for a single logical message server. This can be a monolithic server or cluster as defined above.

Client: An application program that uses the JMS API to send messages to, or consume messages from, a server instance.

Linear Scalability: Relationship between some system capability (performance, storage capacity, etc.) and some system resource in which an increase in the amount of resource available causes a proportional increase in the system capability. In the case of linear Scalability, a plot of capability vs. resource results in a straight line.

JMS: (Java Message Service) A standard application programming interface (API) for programs written in the Java language to use for accessing the services of a message system.

I claim:

1. A message system for delivering data in the form messages between message clients;
  the message system being configured to receive messages from message producing clients and to forward messages to message consuming clients;
  the message system comprising a server cluster containing a group of client manager nodes, said group of client manager nodes comprising a plurality of client manager nodes;
  each client manager node of said group of client manager nodes comprising means for connecting to clients, means for managing client connections and means for forwarding messages received from message producing clients to message manager nodes, and means for forwarding messages received from message manager nodes to message consuming clients;
  the server cluster further containing a group of message manager nodes being configured differently from the client manager nodes, said group of message manager nodes comprising a plurality of message manager nodes;
  each message manager node comprising means for storing and distributing messages, said messages comprising a destination information addressing a destination, said destination being at least one of a queue and a topic;
  the system further comprising communication channel means for providing a multicast communication channel for forwarding messages between said group of client manager nodes and said group of message manager nodes.

2. The message system of claim 1:
  said message manager nodes being configured to comprise destinations, said destinations being at least one of a queue and a topic;
  each client manager node comprising computer program code means for sending message data across said multicast communication channel,
  said message data containing a destination information and not containing an individual address of a message manager node,
  each message manager node comprising computer program code means for receiving message data comprising destination information matching a destination of the message manager, and for maintaining said destination being at least one of a queue and a topic.

3. The message system of claim 2 where each message manager node further comprises data storage means for storing message data in at least one of a queue and a topic and comprises means for sending message data, depending on the content of a request signal.

4. The message system of claim 1 where the number of the client manager nodes of said group of client manager nodes is independent from the number of the message manager nodes of said group of message managers.

5. The message system of claim 1 in which not all possible pairs of nodes in the server cluster are required to exchange data directly.

6. The message system of claim 1, in which a reliable multicast communications protocol is used for inter-node data transfer, in which a plurality of message manager nodes is provided, wherein at least two message manager nodes are configured to contain identical destinations to maintain one or more identical, redundant copies of stored data received in the same multicast transmission from a client manager as the original copy of stored data.

7. A method for delivering data in the form messages between message clients using a server cluster comprising the steps of:
  providing a group of client managers of said server cluster, said group of client managers comprising a plurality of client manager nodes;
  providing a group of message managers of said server cluster, said group of message managers comprising a plurality of message managers having at least one destination, said destination being at last one of a queue and a topic;
  connecting a message client to a client manager node of said group of client managers of said server cluster;
  transmitting a message from said message client to said client manager node;
  depending on the content of said message, sending message data by said client manager across at least one multicast communication channel connected to said client manager, said message data comprising a destination information addressing a destination; and
  receiving said message data by all message managers having said destination addressed by said destination information and storing said message data on data storage means of said message managers.

8. The method of claim 7, further comprising the steps of:
  depending on a list of client subscriptions of said message manager, sending message data comprising a client information from one message manager across said at least one multicast communication channel;
  receiving said message data by the client manager addressed by said client information; and
  transmitting, depending on the content of said message data, a message to the message client addressed by said client information by said client manager.

9. The method of claim 8 wherein in said group of message managers primary message managers and backup message managers are provided, each backup message manager containing the same destinations as one associated primary message manager and controlling regularly whether said associated primary message manager functions, wherein each backup manager monitors the multicast communication on said multicast communication channel and stores the same message data as said associated primary message manager, and wherein each backup manager does not send any message data unless said associated primary message manager fails to function.

10. The method of claim 9 where each backup message manager is associated a channel rank and where upon failure of a primary message manager, the associated backup message manager having the lowest or highest channel rank changes its status and becomes a primary message manager.

11. The method of claim 7, wherein, if the message size exceeds a maximum message size value, said message to be transmitted between said message client and said message manager is fragmented by the message manager or by the message client and sent as a separate command.

12. The method of claim 1, wherein at least two multicast communication channels are present, and wherein either every client manager node is connected to all of said multicast communication channels and every message manager node is connected to only one of said multicast communication channels or every message manager node is connected to all of said multicast communication channels and every client manager node is connected to only one of said multicast communication channels.

13. A computer-readable medium having computer readable program code means embodied therein for enabling a computer to serve as a client manager in a server cluster, the computer-readable medium comprising computer readable code means for enabling the computer:
   to establish a connection to a message client;
   to communicate with at least one of a plurality of message manager nodes comprising means for storing messages and at least one destination across a multicast communication channel, said destination being at least one of a queue and a topic;
   to receive a message from said message client, and
   depending on the content of said message, to transmit message data across said multicast communication to at least one of said message manager nodes, said message comprising a destination information addressing a destination,
   further comprising computer readable code means for enabling the computer:
   to receive message data containing a client information from a message manager node, and
   to transmit, depending on the content of said message data, a message to the message client addressed by said message data.

14. The computer-readable medium of claim 13, wherein said computer readable code means for enabling the computer to establish a connection to a message client comprise means employing a library written in the Java language and conforming to the Java Message Service API.

15. The computer-readable medium of claim 13, wherein said computer readable code means comprise the following elements: a core module comprising session tasks and session command dispatchers, a client I/O module for routing commands, sending messages to a message client and receiving messages from a message client, said client I/O module comprising command routing means and connection management means, and a cluster I/O module for routing commands, sending messages to a message manager and receiving messages from a message manager, said client I/O module comprising command routing means and channel management means.

16. The computer-readable medium of claim 13, wherein said computer readable code means comprise configuration data, means for creating a digest of said configuration data and means for sending said digest to other client manager nodes and means for receiving a configuration data digest from other client manager nodes, as well as means for acquiring configuration data from other client manager nodes in case the digest of its configuration data and a received configuration data digest do not match.

17. A computer-readable medium having computer readable program code means embodied therein for enabling a computer to serve as a message manager node in a server cluster, the computer-readable medium comprising computer readable code means for enabling the computer to communicate with at least one client manager across a multicast communication channel, to receive message data from said client manager node, said message data comprising a destination information addressing a destination, depending on the destination information, to store said message data, to maintain a list of client subscriptions, and to compare the list of client subscriptions to available messages, and, when there is a match, for transmitting message information with a client information to a client server across said multicast communication channel.

18. The computer-readable medium of claim 17, wherein said computer readable code means comprise the following elements: a core module comprising a destination manager task, an admin manager task, a config distributor task, a reliability manager task an destination tasks, at least one destination command dispatcher, and a cluster I/O module for routing commands, sending messages to a client manager and receiving messages and requests from a client manager, said client I/O module comprising command routing means and channel management means.

19. The computer-readable medium of claim 17, wherein said computer readable code means comprise configuration data, means for creating a digest of said configuration data and means for sending said digest to other message manager nodes and means for receiving a configuration data digest from other message manager nodes, as well as means for acquiring configuration data from other message manager nodes in case the digest of its configuration data and a received configuration data digest do not match.

20. A message system for delivering data in the form of messages between message clients, the message system being configured use at least one of queues and topics as destinations, and being configured to receive messages from message producing clients and to forward messages to message consuming clients, the system comprising:
   a server cluster containing a group of client manager nodes;
   each client manager node of said group of client manager nodes comprising means for connecting to clients, means for managing client connections, means for forwarding messages received from message producing clients to message manager nodes, said messages comprising destination information specifying at least one of a queue and a topic, and means for forwarding messages received from message manager nodes to message consuming clients;
   the server cluster further containing a group of message manager nodes being configured differently from the client manager nodes;
   each message manager node comprising means for storing and distributing messages and means for managing at least one of a queue and a topic, said messages comprising a destination information addressing a destination, said destination being at least one of a queue and a topic;
   the system further comprising communication channel means for providing a multicast communication channel for forwarding messages from a plurality of said client manager nodes to a plurality of said message manager nodes, and vice versa;
   wherein at least two message manager nodes are configured to comprise identical destinations, each of which is arranged to maintain a redundant copy of a message received in the course of the same multicast transmission from a client manager to said destination, said destination being at least one of a queue and a topic.

* * * * *